Dec. 7, 1965  L. O. VARGADY  3,221,594
OPTICAL READ-OUT SYSTEM HAVING A BI-PRISM WITH INTEGRAL SCREEN
Filed Sept. 18, 1961  2 Sheets-Sheet 1

INVENTOR.
LESLIE O. VARGADY
BY
ATTORNEYS

Dec. 7, 1965 L. O. VARGADY 3,221,594
OPTICAL READ-OUT SYSTEM HAVING A BI-PRISM WITH INTEGRAL SCREEN
Filed Sept. 18, 1961 2 Sheets-Sheet 2

INVENTOR.
LESLIE O. VARGADY
BY
ATTORNEYS

United States Patent Office 3,221,594
Patented Dec. 7, 1965

3,221,594
OPTICAL READ-OUT SYSTEM HAVING A
BI-PRISM WITH INTEGRAL SCREEN
Leslie O. Vargady, Rochester, N.Y., assignor to Bausch &
Lomb Incorporated, Rochester, N.Y., a corporation of
New York
Filed Sept. 18, 1961, Ser. No. 138,984
1 Claim. (Cl. 88—24)

This invention relates to an optical read-out system and more particularly to a system having means for indicating changes in the position of a movable element.

Reading devices for measuring scales often include means for projecting a scale division onto a viewing screen. The scale division is brought into alignment with an index line in order to measure displacement of the moving element. It is desirable to improve the line sharpness, illumination brightness, and the line-index line setting accuracy in such devices.

Increasing the illumination brightness in the proximity of the line image used in a line-index-line setting and improving line sharpness facilitate reading and also enable an operator to more accurately estimate an increment change.

An optical read-out system according to the present invention includes means for improving the accuracy of the measuring devices, increasing the image sharpness, and also increasing the illumination brightness in the proximity of an indicating area. The system is generally compatible with commercially available read-out devices, and may be added to those devices in order to obtain advantageous results.

The present invention contemplates a system which is relatively inexpensive to manufacture and one which may be added to conventional devices at a relatively low cost. In either case, the slight increase in cost is more than compensated for by the enhanced characteristics obtained. The system may also be incorporated in microscopes, telescopes or the like.

Briefly, a device according to the present invention includes a small displacement image shifter such as a relatively weak bi-prism placed between a scale and an image plane or screen. The scale is then projected through the relatively weak bi-prism onto the screen. The bi-prism may be considered to be a Fresnel prism. The prism is arranged so that the ray paths of the respective scale divisions will converge inwardly toward each other as they are projected onto the screen. This arrangement improves the image brightness and line sharpness to improve the accuracy of the device and facilitate reading of the device. Changes in the optical co-ordinates are effective to obtain various results. Such changes are described in the various embodiments of the invention.

In the first embodiment of the invention, the prism is placed relatively close to the scale. A ratio between the prism to object distance and the prism to image distance is such that the images of two adjacent scale divisions are superimposed on the screen to form a common image when the center of an interval between the adjacent lines is aligned with the apex of the prism. The contrast of the resulting common image is improved since the brightness of the surrounding superimposed background is approximately twice the brightness of the regular field illumination. In this embodiment, scale errors may be compensated for since two scale divisions are used to replace a single mark.

In the second embodiment of the invention the prism is placed at a distance which is relatively close to the screen. The ratio between the image to object distance and the prism to image distance is such that a single scale division is reduced in width by the prism. The light rays passing through the bi-prism converge inwardly toward one another to reduce the image width of a scale division when the image is in alignment with the apex of the bi-prism. This arrangement improves the line-index line setting accuracy by a sudden reduction of the image width of the line when alignment is obtained. The marginal elements of an image are brought together by the effect of the prism. The reduction in image width obtained when a scale division comes into alignment with the prism apex gives the appearance of the scale jumping into position.

In the third embodiment of the invention the bi-prism is arranged so that two adjacent scale lines are projected through the prism. The effect of the prism is to narrow the spacing between the pair of lines. The line images are used as a double line for alignment with a single index line on a screen.

Changes in the optical parameters have been described hereinabove and hereinafter as changes in the ratio between the object distance from the prism to the image distance from the prism. The term optical parameters as used in the present application is intended to cover changes in prism deviating power, refractive index, wedge angles and distances. Such changes may be made in order to adapt the read-out system to various instruments or devices without departing from the scope of the appended claims.

The invention will now be described in more detail in connection with the accompanying drawings, in which:

Like reference numerals have been used in FIGS. 1–4 to indicate similar parts. FIG. 1 shows a conventional read-out system, and, FIGS. 2–4 show a read-out system according to a first embodiment of the invention.

Figure 1:
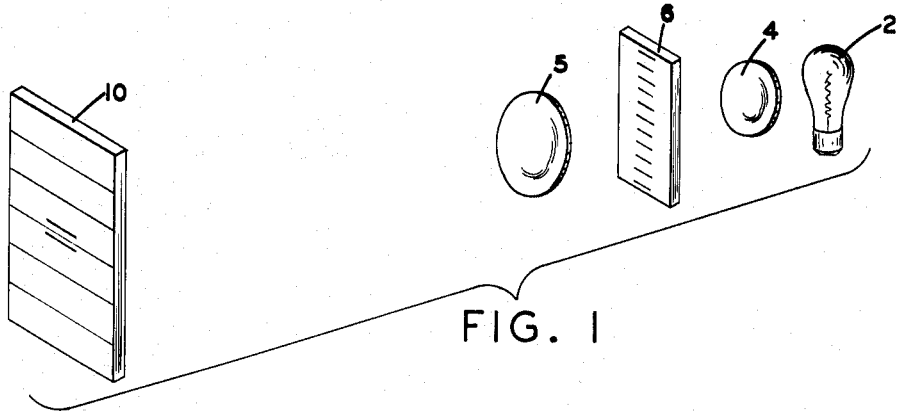
FIG. 1 is a diagrammatic view of a conventional optical read-out system.

A conventional read-out system as well as a system according to a first embodiment of the invention includes means for projecting an image of a scale division onto a screen. Generally a light source 2 is combined with a condenser lens 4 and an objective lens 5 to project an image of a scale 6 onto a screen 10. The lens 4 collimates the light from the light source 2 and directs the light rays through the scale 6 and the projection lens 5. The scale 6 may be considered to be a reticle and has opaque markings thereon. Generally, the scale 6 is made of glass or other transmissive material with opaque markings for scale divisions; however, in some cases it may be desirable to have an opaque sheet with transparent scale divisions.

Figure 2:
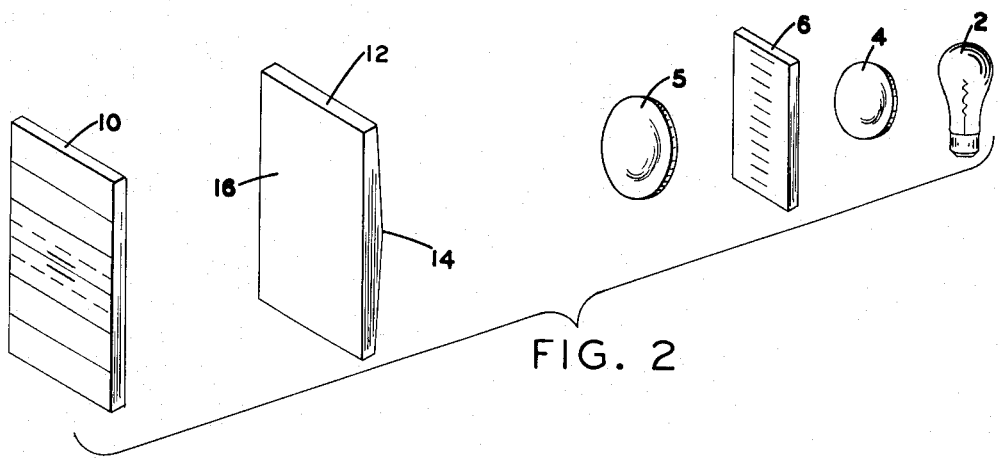
FIG. 2 is a diagrammatic view of an optical read-out system according to a first embodiment of the invention.

In the first embodiment of the invention a relatively weak bi-prism 12 is placed between the lens 5 and the screen 10. The bi-prism 12 may be considered to be a double wedge and is of the type commonly referred to as a Fresnel prism. The bi-prism 12 is arranged with its apex 14 pointing toward the lens 5 and the flat surface 16 facing the screen 10. This arrangement is preferred in order to facilitate mounting of the prism; however the converse arrangement may be used without departing from the scope of the invention. An image of two adjacent scale divisions is projected through the prism 12 and onto the screen 10. When the center of the spacing between the adjacent scale divisions is in alignment with the apex 14 of the prism 12 the adjacent images converge on the screen 10. The image 17 formed on the screen is a common image i.e. the image of one scale division is superimposed on the image of the adjacent scale division. The dotted lines in FIG. 2 illustrate the area of increased illumination.

Figure 3:
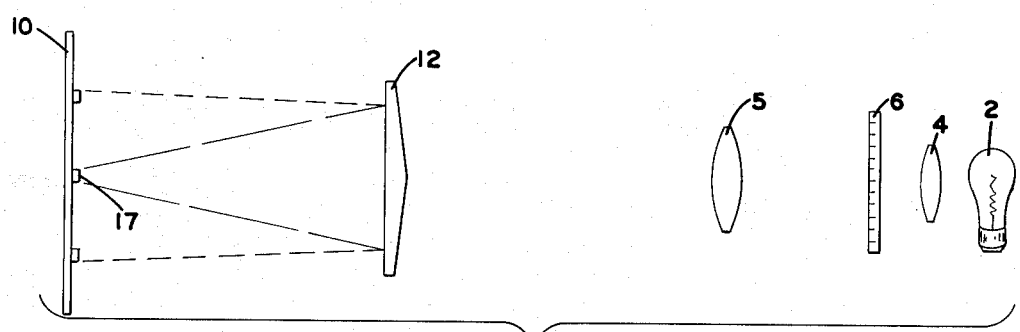
FIG. 3 is a side elevational view partly schematic, showing the first embodiment of the invention.
Figure 4:
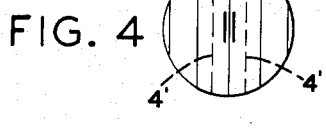
FIG. 4 illustrates an image formed on the screen by an optical read-out system according to the first embodiment of the invention.

The dotted lines in FIG. 3 extending from the bi-prism to the scale indicate the relative position of the respective images obtained by the conventional system shown in FIG. 1. The solid lines illustrate the changes in ray paths obtained by using the relatively weak bi-prism. The solid line 17 represents the common image. FIG. 4 shows a screen or field of view of an ocular and illustrates the image obtained by incorporating the relatively weak bi-prism 12 in the system. FIG. 4 illustrates a band of increased illumination which is indicated by the dotted lines 4'. The overlapping field of illumination caused by the prism in the proximity of the line setting will approximately double the light intensity in this area.

Figure 5:
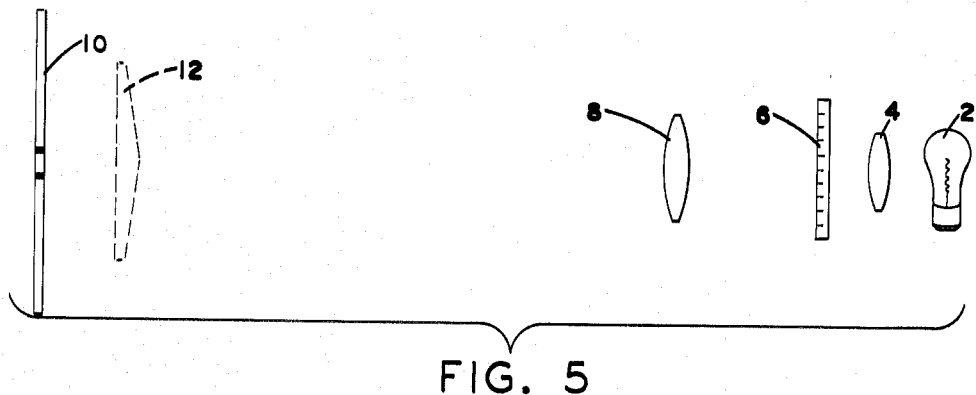
FIG. 5 is a diagrammatic view showing a second embodiment of the invention.
Figure 6:
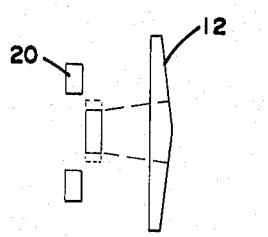
FIG. 6 is a schematic view illustrating the reduction in special width caused by a relatively weak bi-prism when a scale division is in alignment with the apex of the bi-prism.

FIGS. 5 and 6 show a second embodiment of the invention wherein a weak bi-prism 12 is placed relatively close to the screen 10. The light source 2 is combined with a pair of lenses 4 and 5 to project an image of a scale 6 onto the screen 10. The basic arrangement is generally similar to the arrangement described in connection with the first embodiment of the invention. Light from the light source 2 is projected by the lens 4 and directed through the scale 6, the projection lens 8 and onto the screen 10. An image of a scale division is formed on the screen 10. The prism 12 is inserted in the ray path relatively close to the screen 10. This arrangement causes the light rays to converge toward the screen when a scale division is in alignment with the apex of the prism 2. The ray path is shown more clearly in FIG. 6 and illustrates the reduction of the marginal elements of an image 21. The area enclosed by the dotted lines further illustrates this reduction. An index 20 is marked on the screen in a conventional manner and is illustrated as a double line.

Figure 7:
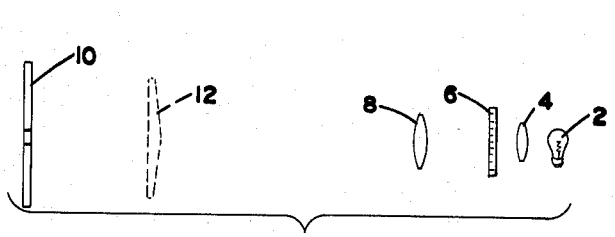
FIG. 7 is a diagrammatic view showing a third embodiment of the invention.

A third embodiment of the invention is illustrated in FIG. 7. The third embodiment is generally similar to the first and second embodiments. The projection arrangement is the same as that shown in the description of the previously defined embodiment. The location of the prism taken with respect to its optical parameters is such that the images of two adjacent scale lines are projected through the prism. The spacing between the images of the scale lines is reduced by the prism. The line images are used as a double line and are aligned with a single index mark. When the center of an interval between two adjacent scale lines 30 are aligned with the apex of the prism 12 the spacing between the corresponding line images is reduced. The projected images of two adjacent scale lines are deviated toward each other. This deviation is less than a scale interval.

Figure 8:
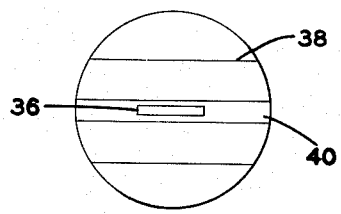
FIG. 8 illustrates an image formed on a screen by an optical system according to the third embodiment of the invention.
Figure 9:
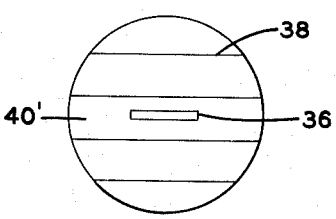
FIG. 9 illustrates the effect of removing the prism from the third embodiment of the invention.

The field of view shown in FIGS. 8 and 9 have an index line 36, and the scale images 38 illustrated thereon. The interval 40 between the images of the scale divisions is reduced by the prism to facilitate reading of the device. FIG. 8 illustrates an optical device of the type having a relatively weak bi-prism and consequently having a relatively narrow interval 40 between the image lines. FIG. 9 shows the images formed when the bi-prism is removed from the system. In FIG. 9 the interval 40' is relatively wide and corresponds to an image formed by a conventional system.

Figure 10:
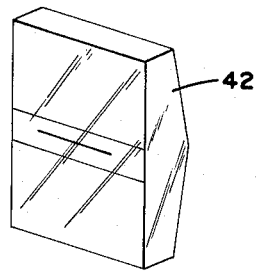
FIG. 10 is a perspective view showing a modified prism screen assembly for use in the second embodiment of the invention.

FIG. 10 illustrates an integral structure 42 including a screen and a prism. The structure 42 may be incorporated in the second embodiment of the invention. The integral structure is arranged so that the image of an aligned scale division will be reduced in width to thereby improve the line sharpness and illumination brightness.

Figure 11:
FIG. 11 illustrates a small displacement image shifter comprising a pair of plane parallel glass plates.

Another modification of the invention is shown in FIG. 11. In this case two plane parallel glass plates 44 tilted with respect to each other with an internal angle of slightly less than 180° have been used to cause the desired image displacement. In this case the image shifting of the tilted plane parallel glass plates is generally similar to the effect of the bi-prism in the previous embodiments.

Figure 12:
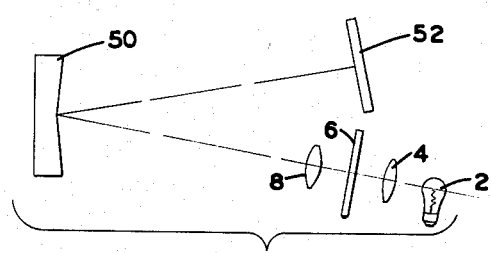
FIG. 12 is a diagrammatic view which illustrates a fourth embodiment of the invention.

A Fresnel mirror 50 may be incorporated in place of the conventional bi-prisms shown in the previous embodiments. This feature is illustrated in FIG. 12. A light source is combined with a scale 6 and a condensing and projecting lens 4 and 8 to project an image of a scale division through the reflecting mirror 50 onto the screen 52. The mirror 50 comprises two reflecting surfaces tilted with respect to each other with an internal angle of slightly less than 180°. The mirror 50 is placed according to the various embodiments dependent upon the results desired.

What is claimed is:

An optical read-out system having a scale, a screen, and means for projecting an image of said scale upon said screen, and means including a relatively weak bi-prism placed between said scale and said screen bringing together the marginal elements of an image of a scale line width to thereby reduce the width of the image when the scale line is in alignment with the apex of said bi-prism, said screen being integral with said bi-prism.

References Cited by the Examiner

UNITED STATES PATENTS

| | | | |
|---|---|---|---|
| 1,424,556 | 8/1922 | Cooke | 88—24 |
| 1,580,242 | 4/1926 | Girddansky | 352—86 |
| 1,899,804 | 2/1933 | Hopfield | 88—24 |
| 2,157,099 | 5/1939 | Rosenhauer | 88—16.6 |
| 2,286,242 | 6/1942 | Terwilliger | 88—16.6 |
| 2,472,259 | 6/1949 | McPherson | 178—6.5 X |
| 2,726,573 | 12/1955 | Maloff | 88—57 |

FOREIGN PATENTS 733,202   7/1932   France.

LEO SMILOW, *Primary Examiner.*

EMIL G. ANDERSON, LEYLAND M. MARTIN,
*Examiners.*